United States Patent [19]

Degenhardt

[11] Patent Number: 5,007,575

[45] Date of Patent: Apr. 16, 1991

[54] DEVICE FOR PRODUCING CONE-SHAPED BODIES OF GLASS, PARTICULARLY TIFFANY-STYLE LAMPSHADES

[76] Inventor: Peter Degenhardt, Arnoldstrasse 63, D-2000, 50 Hamburg, Fed. Rep. of Germany

[21] Appl. No.: 408,041

[22] Filed: May 24, 1989

[30] Foreign Application Priority Data

Jun. 1, 1988 [DE] Fed. Rep. of Germany ... 8807147[U]

[51] Int. Cl.[5] ............................................ B23K 37/04

[52] U.S. Cl. .................................... 228/44.3; 228/47; 228/903; 65/58; 65/154; 269/43

[58] Field of Search .................. 228/4.1, 44.3, 47, 48, 228/57, 903, 121, 186; 65/58, 59.4, 153, 154; 269/37, 43

[56] References Cited

U.S. PATENT DOCUMENTS

| | | | |
|---|---|---|---|
| 120,991 | 11/1871 | Miller | 228/48 |
| 4,146,162 | 3/1979 | Skakunov | 228/48 |
| 4,679,722 | 7/1987 | Flindt et al. | 228/48 |
| 4,832,322 | 5/1989 | Christenson | 228/47 |
| 4,861,364 | 8/1989 | Trujillo | 65/58 |

*Primary Examiner*—Sam Heinrich

*Attorney, Agent, or Firm*—Lane, Aitken & McCann

[57] ABSTRACT

The invention relates to a device for producing essentially cone-shaped flat bodies, whose surface area consists of n attached segments, (preferably 4, 6, 8), each composed of a number of attached glass pieces connected to one another, particularly Tiffany-style lampshades, whereby the boundary lines of adjoining segments lie in a common plane or a straight line, having a base body or form cone for placing glass pieces to be soldered, a bottom plate placed at the form cone and a rod, that is positioned in the middle of the bottom plate and form cone. The invention is further characterized by the fact, that the rod (16) is adjustably mounted at the form cone and at the bottom plate in an axial direction, the bottom plate (15) is shaped as an n-lateral, bilateral or similar, and that when positioning the lower portion of the rod (16) and any side of the n-lateral of the bottom plate on a supporting surface (17), the diametrically opposite boundary line (18) of two segments of the body or the form cone (10) are horizontally adjustable through axial adjustment of the rod (16).

6 Claims, 2 Drawing Sheets

FIG. 1
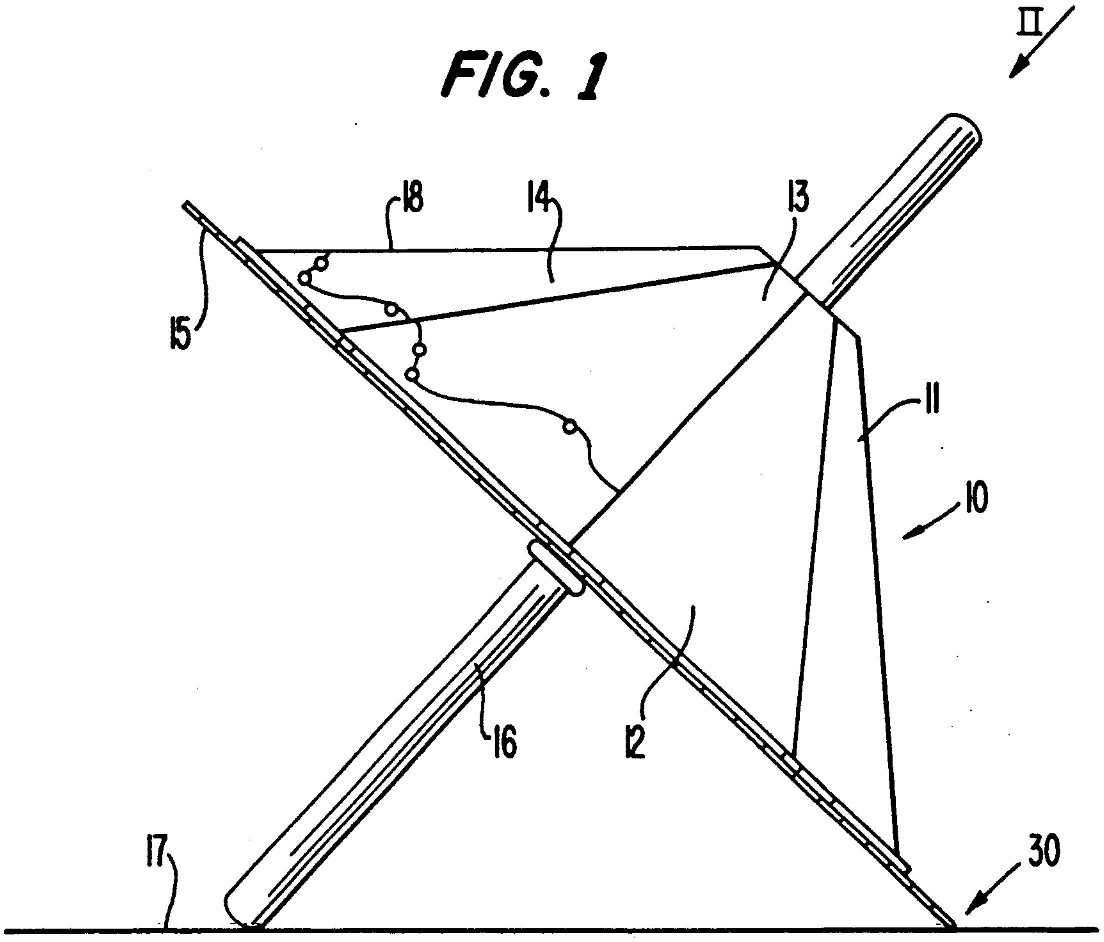
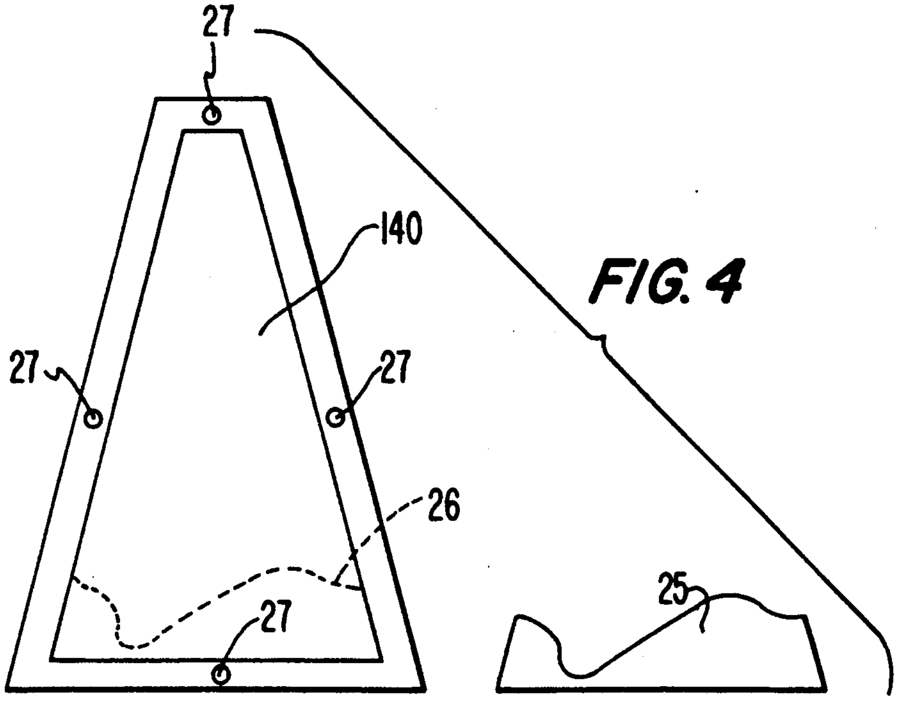
FIG. 4

DEVICE FOR PRODUCING CONE-SHAPED BODIES OF GLASS, PARTICULARLY TIFFANY-STYLE LAMPSHADES

The invention relates to a device for producing essentially cone-shaped flat bodies, whose surface area consists of n fastened segments, (preferably 4, 6, 8), each composed of a number of attached glass pieces connected to one another, particularly Tiffany-style lampshades, wherein the boundary lines of adjoining segments lie in a common plane or in a straight line, having a base body or a form cone for the placing of glass pieces to be soldered, a base plate positioned at the form cone and a rod, arranged axially in the middle of the bottom plate and the form cone.

Problems occur with a known device of the above type during application, when soldering together the separate segments of a lamp that contains a metallic mount in the shape of a groove outline. For this purpose, the boundary lines for the soldering procedure should be horizontally aligned, if possible, since otherwise insufficient soldering results. It is therefore necessary, before any individual soldering process, to align the form carefully with the glass or mosaic segments on top of it.

The object of the present invention is to design a form that needs only one single alignment procedure, even when, due to a large number of individual segments, many soldering points are needed, as well as when a horizontal support is not available.

This object is achieved by means of an axially adjustable mounting in an axial direction of the rod, at the form cone and at the bottom plate, by shaping the bottom plate as an n-lateral, bilateral or similar, and by making the diametrically opposite boundary line of two segments of the body or of the form cone horizontally adjustable, when positioning the lower portion of the rod and any side of the n-lateral of the bottom plate on a support.

When using the device claimed in the invention, the following procedure is to be used. The individual glass pieces are trimmed in the desired colors and shapes and fitted so that they fill in a single segment within a work frame. When such a segment area is exactly filled in, the work pieces may be placed onto the form body. Here, they may be fixed at a few locations. In similar manner, other segments are fitted together and likewise placed onto the form body.

The individual boundary lines of the glass piece segments must now be soldered together, and for this purpose, it is necessary that the soldered boundary lines are aligned horizontally. By using a level, the upper boundary line of two adjoining segments can be aligned horizontally, by variously pushing in or pulling out the rod of the form cone. Once this position is attained, the boundary line can be soldered. Then, by turning the form cone, a new boundary line adjustment procedures being necessary, and the next soldering procedure can be begun.

The invention is discussed below with reference to the examples shown in the drawings.

FIG. 1 shows a side view of a form cone with glass pieces in soldering position.

FIG. 4 shows a top view of a work frame.

Figure 2:
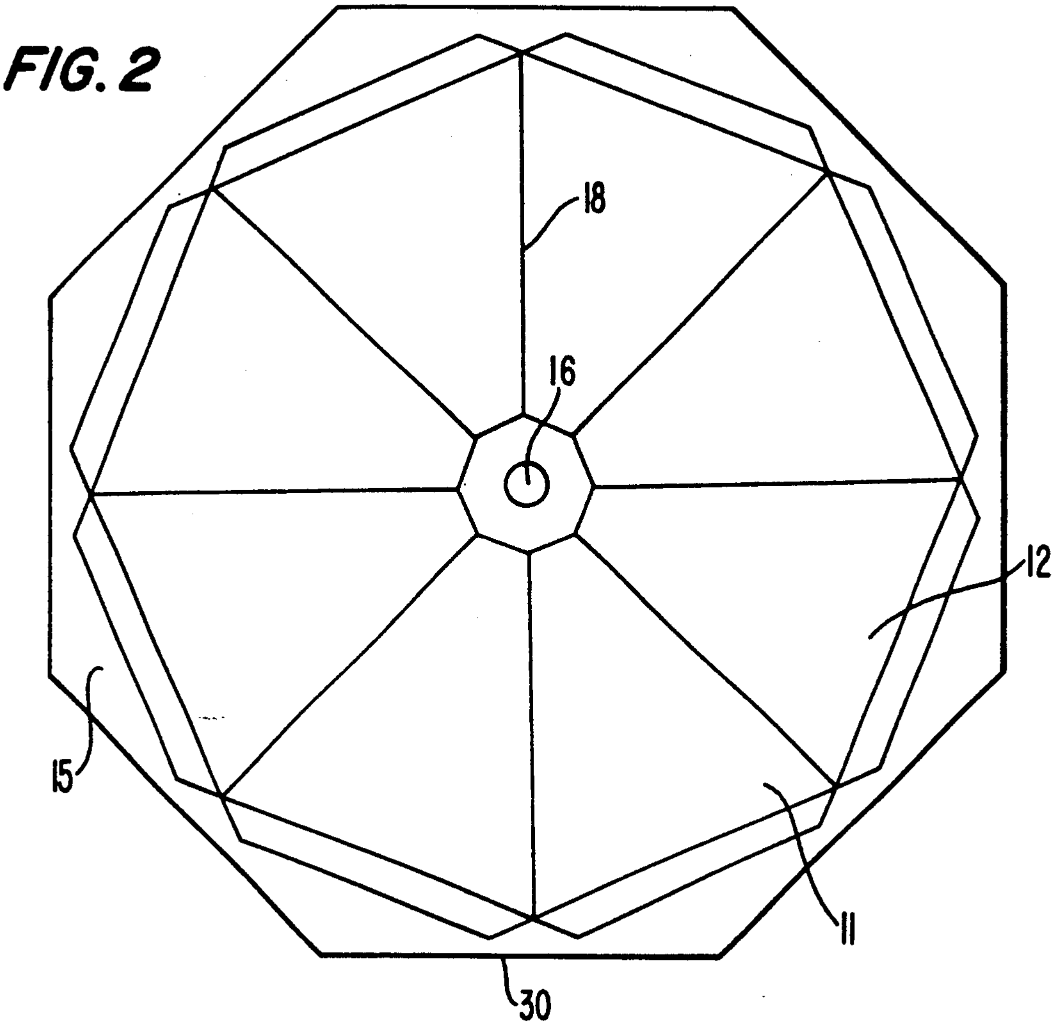
FIG. 2 shows a top view of the form cone according to the arrow II shown in FIG. 1.
Figure 3:
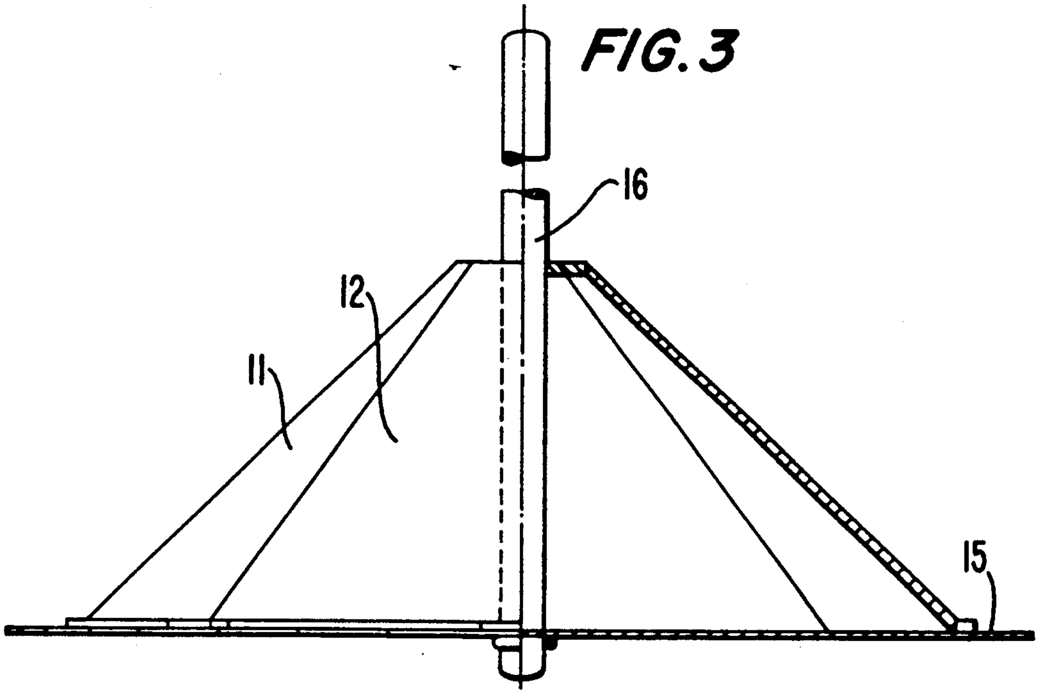
FIG. 3 shows a side view of the form cone with rod inserted.

In the figures, the form cone is marked by the number 10, and an example was chosen, where the form cone is shaped by eight segments, four of which are given the reference numbers 11 to 14. The individual segments are in the shape of a trapezoid, as shown in FIG. 4, which depicts a work frame 140 for a segment. The segments of the form cone 10 are made of cardboard and are joined to form a truncated cone with eight surfaces.

The individual segments are attached to a bottom plate 15 made of cardboard that also is shaped as an octagon, according to the number of segments.

The rod 16 is axially aligned with both the form cone 10 and the bottom plate 15, both pieces 10 and 15 being axially fastened with the rod 16, in any manner, so that the rod may be brought into various axial positions, i.e., can be inserted variously into the form cone 10.

In FIG. 1, the rod 16 is inserted to such an extent into the form cone 10 that the upper boundary line 18 between two segments lies parallel to the work surface 17. It is obvious that this adjustment procedure can be performed by using a level or by eye measurement so that the boundary line is horizontally adjusted, even if the work surface 17 should be inclined. In the position shown, not only part of the rod 16, but also a support surface, marked 30, or a side line of the base plate 15, rest on the work surface 17. If separate mosaic or glass pieces of the actual lampshade are present on the form, the accompanying boundary line of the individual mosaic segments must also be arranged horizontally, and in this position soldering may be performed flawlessly. At the end of the soldering process the form cone 10 is turned 1/8 of its circumference, so that a new boundary area is aligned horizontally between two segments. These circumstances are easily recognizable in FIG. 2, showing how the boundary line 18 is vertically arranged to the opposite support surface 30 of the base plate. It is obvious that by only one single adjustment of the rod 16, relative to the form cone 10, one boundary line between adjoining segments will always be arranged horizontally. This represents a significant advantage, considering that the Tiffany lamps may easily contain 12 or 24 individual segments.

In FIG. 4 a work frame 140 for one segment is shown. One boundary line is marked 26. By using the work frame 14, the individual mosaic segments may be positioned in exact position. A part 25 is used as the lower boundary, serving as a work template for the correct downward adjustment of the glass pieces. The work template 140 can be fastened to a support by using fastening device 27.

If a base plate 15 is used, in the shape of a 48-sided polygon, it is possible to construct a Tiffany lamp from three, four, six, eight, and twelve individual segments. It is also conceivable that the individual segments are unequally large, e.g., segments with a base unit length four and with a base unit length five are intermingled. At any rate, according to the device claimed in the invention, it is easily possible to bring the corresponding solder lines into a horizontal position by one single alignment procedure.

What is claimed is:

1. A device for producing essentially cone-shaped bodies having flat sides composed of n attached adjoining segments, n being an integer, each segment being composed of a number of glass pieces fastened to each other, whereby boundaries of adjoining segments lie in a common plane or in a straight line, the device having a form body for the placing thereon of glass pieces that are to be soldered, said form body defining a base, a bottom plate placed at the base of the form body, and a rod arranged axially in the middle of the bottom plate and the form body, characterized by the fact that the rod (16) is adjustably mounted relative to the form body and the bottom plate in an axial direction, said rod having a lower portion, the bottom plate (15) is a polygon having n-sides, and each said boundary line is diametrically opposite a side of the bottom plate, whereby, when the lower portion of the rod (16) and any side of the bottom plate (15) are placed on a supporting surface (17), the diametrically opposite boundary line (18) of two segments of the form body (10) is adjustable to a horizontal position through axial adjustment of the rod (16).

2. A device as claimed in claim 1, wherein a work frame (140) encloses the surface of one of the segments (14) and serves as a form for the individual glass pieces of a segment.

3. A device as claimed in claim 1, wherein the segments (14) have a non-straight line lower boundary, in the shape of a curve (26).

4. A device as claimed in claim 1, wherein the form body (10), the base plate (15) and the work frame (140) are made of cardboard.

5. A device as claimed in claim 1, wherein the form body has a generally conical shape.

6. A device as claimed in claim 5, wherein the generally conical shape is a truncated pyramid.

* * * * *

UNITED STATES PATENT AND TRADEMARK OFFICE
CERTIFICATE OF CORRECTION

PATENT NO. : 5,007,575
DATED : April 16, 1991
INVENTOR(S) : Peter Degenhardt

It is certified that error appears in the above-identified patent and that said Letters Patent is hereby corrected as shown below:

Column 1, line 58, after "line", insert --can be brought into horizontal alignment, without any new--.

Signed and Sealed this

Sixth Day of October, 1992

*Attest:*

DOUGLAS B. COMER

*Attesting Officer*

*Acting Commissioner of Patents and Trademarks*